United States Patent [19]

Ohtawa et al.

[11] 4,411,611

[45] Oct. 25, 1983

[54] BRIQUETTING MACHINE

[75] Inventors: Kimiaki Ohtawa; Yasuo Fukada, both of Hiroshima, Japan

[73] Assignee: Mitsubishi Jukogyo kabushiki Kaisha, Tokyo, Japan

[21] Appl. No.: 252,604

[22] Filed: Apr. 9, 1981

[30] Foreign Application Priority Data

May 16, 1980 [JP] Japan ................................ 55-64091

[51] Int. Cl.$^3$ ............................................ B29C 25/00

[52] U.S. Cl. .................................... 425/237; 425/294; 425/308

[58] Field of Search ........................ 425/237, 294, 308

[56] References Cited

U.S. PATENT DOCUMENTS

| | | | |
|---|---|---|---|
| 2,717,419 | 9/1955 | Dickey | 425/237 |
| 3,091,012 | 5/1963 | Bell | 425/237 |
| 3,300,815 | 1/1967 | Rohaus et al. | 425/237 |
| 3,897,183 | 7/1975 | Hofmann et al. | 425/237 |

*Primary Examiner*—James R. Hall
*Attorney, Agent, or Firm*—Wenderoth, Lind & Ponack

[57] ABSTRACT

A briquetting machine for shaping a pulverized and/or powder material includes, on the downstream side of briquetting rolls, a pair of notching rolls provided with blades on their peripheral surfaces. The blades extend in the circumferential direction and/or the widthwise direction. The notching rolls are rotated in opposite directions in synchronization with the briquetting rolls, whereby a continuous strip of briquettes discharged from the briquetting rolls can be sheared and separated by the notching rolls. In an alternative embodiment of the present invention, in the aforementioned type of briquetting machine, the interval between the notching rolls is selected such that when the continuous strip of briquettes is bitten between the notching rolls and is not sheared nor separated but it is merely notched by the notching rolls. A briquette guide is disposed on the downstream side of the notching rolls. A divider consisting of a roll and blades mounted radially on the circumference of the roll is disposed on the downstream side of the briquette guide. The divider is rotated in synchronization with the briquetting rolls and notching rolls, whereby webs connecting the briquettes extruded from the notching roll can be separated at the notched positions.

3 Claims, 12 Drawing Figures

BRIQUETTING MACHINE

BACKGROUND OF THE INVENTION

The present invention relates to improvements in a briquetting machine for shaping a pulverized and/or granular material into briquettes.

In a known briquetting machine, such as shown in FIG. 1, high-temperature reduced iron is forcibly fed from a screw feeder a into a gap between griquetting rolls b rotating in the directions represented by the arrows to compress and shape the material into a strip in which respective briquettes e are connected via ribs f. When the strip is discharged from the gap between the briquetting rolls b, then it is guided by a briquette guide c until it reaches the downstream end of the briquette guide c where it is necessary to shear the strip at the positions of the ribs f. However, in this prior art arrangement, since the strip is merely cut and separated by impacting with a divider d, there are shortcomings that separation of the briquettes cannot be achieved smoothly, that sheared positions are not fixed, and that sheared surfaces are uneven, and in the worst case, the strip is not perfectly sheared but is discharged in a condition where a number of briquettes are connected together.

SUMMARY OF THE INVENTION

It is therefore one object of the present invention to provide an improved briquetting machine which is free from the above-mentioned shortcomings.

Another object of the present invention is to provide an improved briquetting machine which can enhance the commercial value of the produced briquettes.

According to the present invention, there is provided a briquetting machine in which on the downstream side of briquetting rolls for shaping a pulverized and/or granular material into briquettes are disposed a pair of notching rolls provided on the peripheries thereof with blades extending in the circumferential direction and/or in the widthwise direction. The notching rolls are separated from each other by a predetermined interval, and are rotated in opposite directions in synchronization with the briquetting rolls, whereby a continuous strip of briquettes discharged from the briquetting rolls can be sheared and separated as by the notching rolls.

The connection of briquettes can be sheared and separated smoothly and reliably at predetermined positions, the size of the briquettes sheared and separated can be kept constant, and the sheared faces are made even. Moreover, the notching rolls have a finishing compression shaping function besides the shearing and separating functions, and thus the surfaces of the briquettes other than the sheared faces also can be finished smoothly. Accordingly, the briquetting machine according to the present invention can enhance the commercial value of the sheared and separated briquettes.

According to another feature of the present invention, the notching rolls are spaced from each other by a predetermined interval. Thus, the continuous strip of briquettes discharged from the briquetting rolls can be notched by the notching rolls to form briquettes which are not completely separated. A briquette guide is disposed on the downstream side of the notching rolls. A divider consisting of a roller and blades mounted radially on the circumference of the roll is disposed on the downstream side of the briquette guide. The divider is rotated in synchronization with the briquetting and notching rolls, whereby the web connections between the briquettes extruded from the notching rolls can be separated at the notched positions.

In this embodiment of the briquetting machine, also the web connections between the briquettes can be sheared and separated smoothly and reliably at predetermined positions, the size of the briquettes after separation can be maintained constant, and the sheared faces are made smooth. Moreover, the notching rolls have a finishing compression shaping function, and thus the surfaces of the briquettes other than the sheared faces also can be finished smoothly. Accordingly, the briquetting machine according to the present invention can enhance the commercial value of the sheared and separated briquettes.

BRIEF DESCRIPTION OF THE DRAWINGS

The above-mentioned and other features and objects of the present invention will become more apparent from the following description of preferred embodiments of the invention taken in conjunction with the accompanying drawings, wherein.

DETAILED DESCRIPTION OF THE INVENTION

Figure 1:
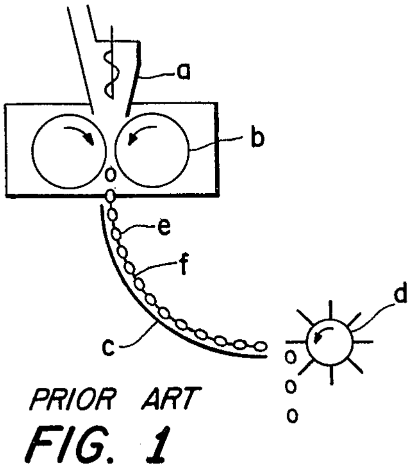
FIG. 1 is a side view of a prior art briquetting machine.
Figure 2:
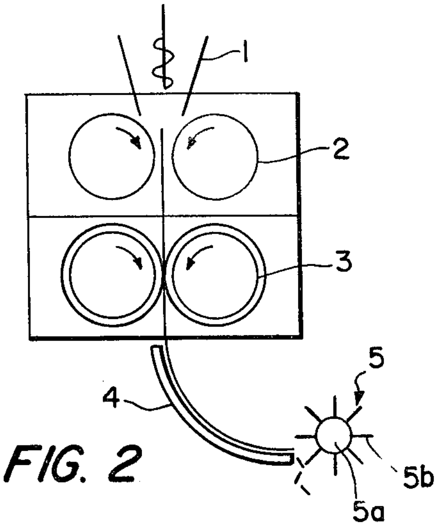
FIG. 2 is a side view showing one preferred embodiment of a briquetting machine according to the present invention.
Figure 3:
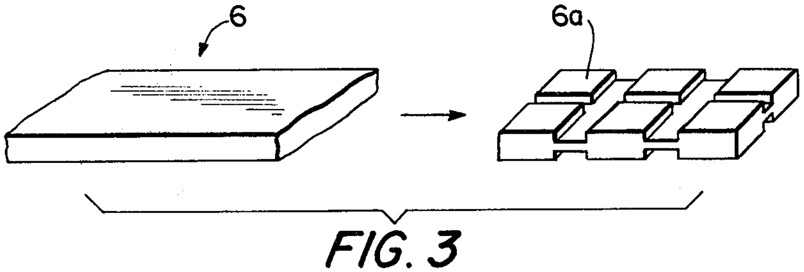
FIG. 3 is a perspective view showing the state where a pulverized and/or granular material has been compressed and shaped by means of briquetting rollers shown in FIGS. 4 and 5 and the state where the shaped body has been notched by means of notching rolls shown in FIGS. 6 and 7.
Figure 4:
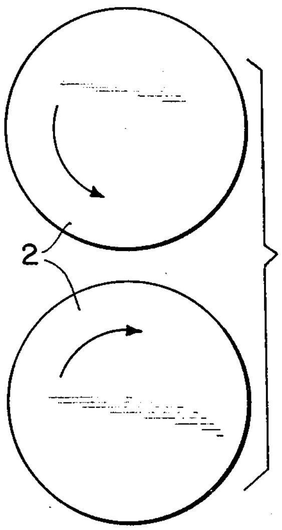
FIG. 4 is a side view showing one example of briquetting rolls.
Figure 5:
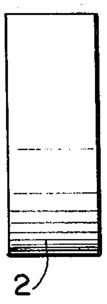
FIG. 5 is a front view of one such roll.
Figure 6:
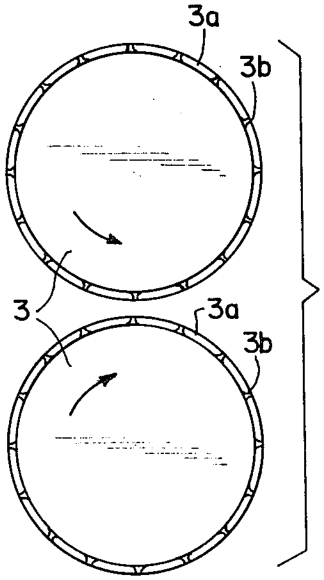
FIG. 6 is a side view showing one example of notching rolls.
Figure 7:
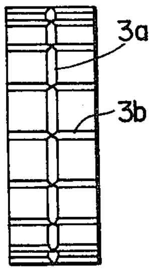
FIG. 7 is a front view of one such roll.

Now, one preferred embodiment of the briquetting machine according to the present invention will be described in greater detail with reference to FIGS. 2 and 7. Reference numeral 1 in FIG. 2 designates a screw feeder for forcibly feeding a pulverized and/or granular material. Numerals 2 in FIGS. 2, 4 and 5 designate briquetting rollers for compressing and shaping the pulverized and/or granular material forcibly fed through the screw feeder 1 into the continuous strip shap 6 shown on the left in FIG. 3. Numerals 3 in FIGS. 2, 6 and 7 designate notching rolls either for shearing and separating the shape 6 into the separate briquettes, or as shown on the right in FIG. 3 for notching the shape 6 by means of blades 3*a* extending in the circumferential direction and blades 3*b* in the widthwise direction provided on the outer circumferential surfaces of the rolls, thereby notching the shape 6 to define longitudinally and transversely spaced briquettes 6*a* separated by thin integral webs. Rolls 3 are rotated in opposite directions and are synchronized with the briquetting rolls 2. In addition, reference numeral 4 in FIG. 2 designates a briquetting guide, numeral 5 designates a divider for separating the webs connecting the briquettes at the notched positions in the case where it has been notched by the shear rolls 3. The divider 5 includes a roll 5*a* and blades 5*b* mounted radially on the roll 5*a* and is adapted to be rotated in synchronization with with the rolls 2 and 3.

Figure 8:
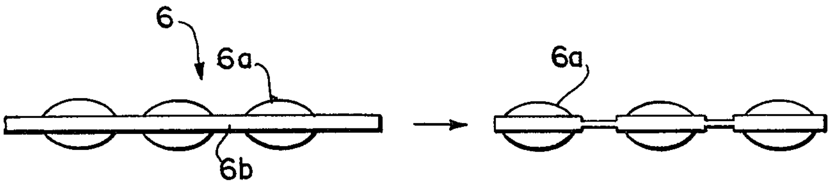
FIG. 8 is a side view showing the state where a pulverized and/or granular material has been compressed and shaped by means of briquetting rolls shown in FIGS. 9 and 10 and the state where the shaped body has been notched by means of notching rolls shown in FIGS. 11 and 12.
Figure 9:
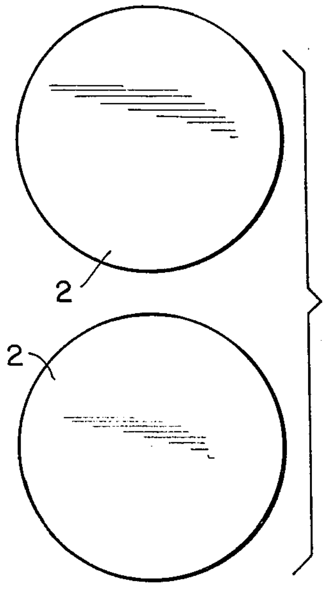
FIG. 9 is a side view showing another example of briquetting rolls.
Figure 10:
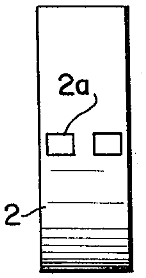
FIG. 10 is a front view of one such roll.
Figure 11:
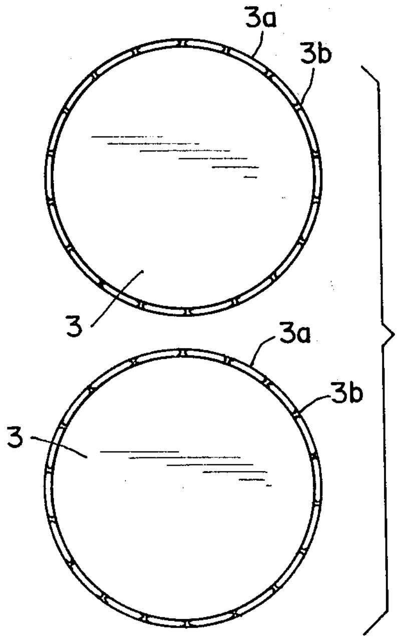
FIG. 11 is a side view showing another example of notching rolls.
Figure 12:
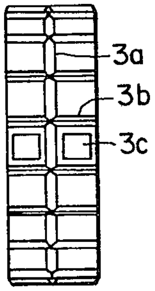
FIG. 12 is a front view of one such roll.

Another preferred embodiment of the briquetting rolls 2 and the notching rolls 3 is illustrated in FIGS. 9 to 12. More particularly, reference numerals 2 in FIGS. 9 and 10 designate briquetting rolls, which compress and shape the pulverized and/or granular material forcibly fed through the screw feeder 1 into the continuous shape 6 shown on the left in FIG. 8, that is, into a strip-like state where respective briquette projections 6*a* are connected via ribs 6*b*. Die recesses 2*a* are arranged in two columns extending circumferentially around the outer peripheral surface of each of the briquetting rolls 2. Reference numerals 3 in FIGS. 11 and 12 designate notching rolls which achieve finishing compression shaping of the respective briquette projections 6*a* by means of die recesses 3*c* arranged in two columns extending circumferentially around the outer peripheral surface of each roll 3, and also which either shear and separate the continuous shape at the positions of the ribs 6*b*, or which notch the ribs 6*b* by means of blades 3*a* extending in the circumferential direction and blades 3*b* extending in the widthwise direction provided on the circumferential surfaces of the rolls 3, thereby forming circumferentially and transversely extending integral webs between circumferentially and transversely spaced units including briquettes 6*a* and portions of ribs 6*b*.

Now the operation of the above-described briquetting machine will be explained. A pulverized and/or granular material is forcibly fed through screw feeder 1 into the gap between the briquetting rollers 2 and is formed thereby into the continuous shape or strip 6. Then the shape or strip 6 is fed into the gap between the notching rolls 3 to be either sheared and separated or notched by means of the blades 3*a* and 3*b*. The sheared and separated briquettes are discharged themselves through the briquette guide 4, whereas the notched connection of briquettes is fed through the briquette guide 4 up to the position of the divider 5, where the notched portions or webs are impacted by the blades 5*b* of the divider 5, and thereby the briquettes can be separated perfectly.

Since many changes could be made to the above construction and many apparently widely different embodiments of this invention could be made without departing the scope thereof, it is intended that all matter contained in the above description or shown in the accompanying drawings shall be interpreted as illustrative and not as a limitation to the scope of the invention.

We claim:

1. An apparatus for forming briquettes from a pulverized and/or granular material, said apparatus comprising:

feeder means for forcibly feeding pulverized and/or granular material;

briquetting means for receiving said material from said feeder means, for compressing and shaping said material into a continuous briquette strip, and for discharging said strip in a direction, said briquetting means comprising a first pair of rolls positioned to receive therebetween said material, said first pair of rolls being rotatable to compress and shape said material and to discharge said strip in said direction;

notching means, positioned downstream of said first pair of rolls with respect to said direction, for receiving said strip from said first pair of rolls, for forming in said strip reduced thickness notches extending parallel to said direction and transverse to said direction, thus defining briquette portions spaced longitudinally and transversely by integral webs at said notches, for further compressing and shaping said briquette portions, and for discharging the thus formed notched strip in said direction, said notching means comprising a second pair of rolls rotatable in synchronization with said first pair of rolls, said second pair of rolls being positioned to receive therebetween said strip, each said roll of said second pair having a cylindrical periphery having extending outwardly therefrom circumferential and axial blades cooperable to form said notches;

guide means, positioned downstream of said second pair of rolls with respect to said direction, for guiding said notched strip discharged from said second pair of rolls; and divider means, positioned downstream of said guide means with respect to said direction, for separating said briquette portions by fracturing said webs along said notches, said dividing means comprising a divider roll having extending therefrom a plurality of divider blades, said divider roll being rotatable in synchronization with said first and second pairs of rolls and being positioned such that said divider blades impact with said notched strip upon discharge thereof from said guide means.

2. An apparatus as claimed in claim 1, wherein each said roll of said first pair of rolls has a smooth periphery, such that said continuous briquette strip has a uniform thickness.

3. An apparatus as claimed in claim 1, wherein each said roll of said first pair of rolls has on the periphery thereof a plurality of die recesses arranged in circumferentially extending columns, such that said continuous briquette strip is in the form of briquette projections connected by integral ribs, and each said roll of said second pair of rolls has on said periphery thereof a plurality of die recesses positioned between adjacent said circumferential and axial blades.

* * * * *